UNITED STATES PATENT OFFICE.

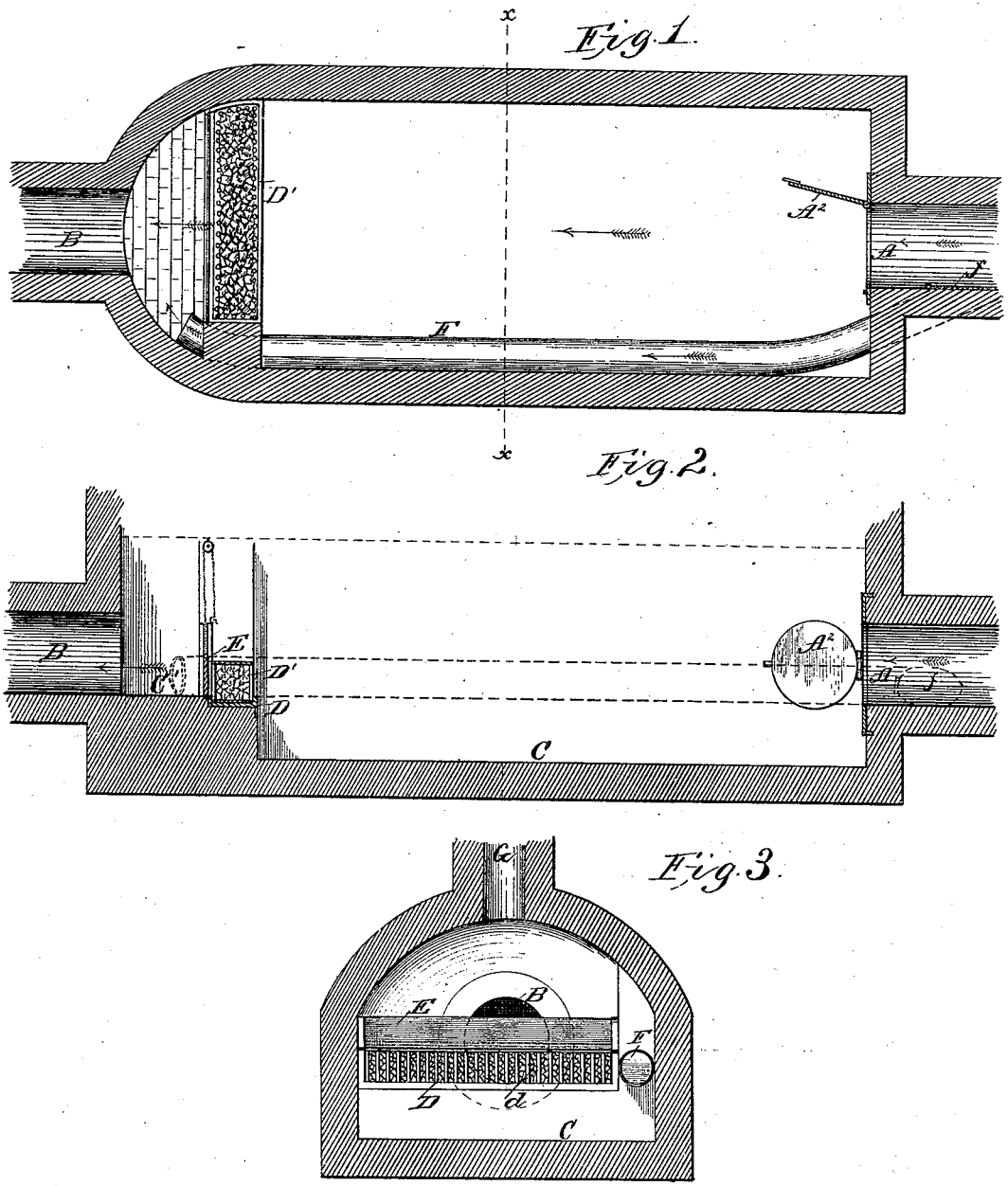

PATRICK MARKEY, OF MILWAUKEE, WISCONSIN.

SEWER CATCH-BASIN.

SPECIFICATION forming part of Letters Patent No. 226,620, dated April 20, 1880.

Application filed March 5, 1880. (No model.)

*To all whom it may concern:*

Be it known that I, PATRICK MARKEY, of Milwaukee, in the county of Milwaukee, and in the State of Wisconsin, have invented certain new and useful Improvements in Catch-Basins for Sewers; and I do hereby declare that the following is a full, clear, and exact description thereof.

My invention relates to catch-basins for sewers; and it consists in a device by which all of the solid matter from the sewer-pipes will be detained and the fluid strained before it passes out of the sewer, as will hereinafter be fully described.

In the drawings, Figure 1 is a horizontal section of my improved catch-basin. Fig. 2 is a vertical longitudinal section; Fig. 3, a transverse section on line $x\ x$, Fig. 1.

I propose to place my catch-basin at suitable intervals along the sewer, generally at points just beyond the intersection of streets, or after the entrance of branch sewers or pipes.

A is the inlet, and B the outlet. C is a depression about two feet deep, which extends to about four-fifths the length of the basin, when a platform, C', on a level with the exit begins. This platform has a depression on its inner edge, in which is embedded a flanged plate, D, for receiving a basket, D', composed of a solid bottom and vertical bands $d$. This basket I fill with charcoal, broken bits of granite, and other filtering substances, and cover with a lid which is hinged to open from the outlet. Just beyond the filter I provide a sluice-gate, E, working in suitable ways.

To take care of the drainage while the basin is being cleaned, I provide a supplemental pipe, F, which, branching out from the inlet, where it is provided with a door, $f$, is carried along one side of the basin through the masonry, and out onto the platform C' beyond the filtering-basket.

The upper part of my basin is arched, and a man-hole, G, is built through it just above the center of the depression.

Operation: The drainage entering the sewer at A will fall into the depression C, which it will fill and overflow, the fluid passing out through the filtering-basket, leaving all the solids in the depression C, and after this has continued until the depression has been about filled with solid matter the door A' may be closed and $f$ opened. The drainage will thus be deflected from the depression, and will flow directly onto the platform, the sluice-gate having been shut to prevent any backflow. The basin may now be entered and its contents removed through the man-hole by a sand-pump or any other means, hose let down, and the basin thoroughly cleaned, after which the sluice-gate may be raised, door A' opened and $f$ closed, when the basin will resume its functions.

The filtering substance in the basket D' should be washed and changed as often as necessary.

The matter taken from my basins will be of more than sufficient value as a fertilizer than the cost of removing it, and the drainage, before it reaches the river or other body of water into which it empties, will have been so purified and freed from putrefying matter as to not be injurious to the fish or the health of the inhabitants along its banks.

What I claim as my invention, and desire to secure by Letters Patent, is—

1. A sewer catch-basin having a depression, C, and filter D' upon a ledge near the outlet, as and for the purpose described.

2. The combination, in a catch-basin for sewers, of the pipe F, depression C, and gate, as set forth.

3. The combination of the depression C, pipe F, filter, sluice-gate, and doors A and $f$, as and for the purpose set forth.

In testimony that I claim the foregoing I have hereunto set my hand this 28th day of February, 1880.

PATRICK MARKEY.

Witnesses:
S. S. STOUT,
E. H. BOTTUM.